Inventor:
Camille Clare Sprankling Le Clair

Patented May 1, 1945

2,374,822

UNITED STATES PATENT OFFICE 2,374,822

MEANS FOR PREVENTING THE AERATION OF LIQUID IN LIQUID CIRCULATING SYSTEMS

Camille Clare Sprankling Le Clair, Ealing, London, England

Application September 30, 1942, Serial No. 460,320
In Great Britain August 22, 1941

16 Claims. (Cl. 103—39)

This invention relates generally to means for preventing the aeration of liquid in liquid circulating systems.

On aircraft and other engines, the oil is frequently withdrawn from the engine sump by a scavenge pump which forces the oil into an oil tank from which it is supplied to the engine by a pressure pump. The scavenge pump usually has a capacity which is greater than that of the pressure pump in order to ensure that the quantity of oil in the sump does not become excessive. Consequently, a mixture of oil and air enters the scavenge pump and is delivered by the pressure pump to the engine. This is particularly disadvantageous in the case of an aircraft engine, because air entrained in the lubricating oil of an aircraft engine causes various difficulties particularly when the aircraft is flying at high altitudes.

An important object of this invention, therefore, is to prevent the flow of air to the scavenge pump used in oil circulating systems of aircraft.

According to the present invention, a liquid circulating system comprising a liquid container and a pump for withdrawing liquid from the container is characterised by means for preventing aeration of the liquid circulated by said pump, which comprises a level detecting means, a liquid supply source, means for controlling the flow of liquid from the said source to the pump such that when the said level detecting means indicates a low level in the container, the flow from the said source is permitted and when the said level detecting means indicates a high level in the container the flow from said source is restricted or stopped, and means for restricting the flow of liquid from the container to the pump when the pump is receiving liquid from the said source, the arrangement being such that the liquid in the container is always maintained at such a level therein that the pump cannot withdraw air therefrom.

The said level detecting means preferably takes the form of means for withdrawing air from the container when the liquid therein falls below a predetermined level, the flow of liquid to the pump from the container then being restricted and the pump receiving liquid from the aforesaid liquid supply source, the said means also withdrawing liquid from the container when the liquid in the latter rises above the said level and the pressure of the liquid thus withdrawn acting to operate a control device in order to cut off the flow of liquid from the said liquid supply source to the pump, which latter then withdraws liquid from the container, the arrangement being such that the pump is at all times prevented from withdrawing air from the container.

In a liquid circulating system which comprises a pump, a feed pipe for connecting the pump to a liquid container, and a discharge pipe for connecting the pump to a tank which comprises or is connected to the aforesaid liquid supply source, the present invention provides means for preventing the aeration of liquid circulated by said pump, including means for connecting said tank or source to said feed pipe, means in the latter for restricting the flow of liquid from the container to the pump when the latter is receiving liquid from said tank or liquid supply source, a control device for controlling the flow of liquid from said tank or supply source to the pump, a fluid circulating means, a discharge pipe for connecting the fluid circulating means to the said control device, a return pipe connecting the said control device back to the container, this pipe containing a flow restricting orifice, and a feed pipe for connecting the container to the fluid circulating means. The latter pipe is so disposed in the container that when the liquid in the container falls below a predetermined level, the fluid circulating means withdraws air from the container and returns it thereto through the above mentioned flow restricting orifice which does not offer sufficient resistance to the flow of air to build up sufficient pressure as to cause any disturbance in the position of the control device, which latter then allows liquid to flow from said tank or liquid supply source to the said pump. When the liquid in the container rises above the said level, however, the fluid circulating means withdraws liquid from the container, and discharges it through the same flow restricting orifice, which offers sufficient resistance to the flow of liquid to raise its pressure enough to cause the said control device to move into a position in which the flow of liquid from the said tank or supply source to the pump is cut off and the pump withdraws liquid from the container.

In one constructional embodiment of the invention as applied to an aircraft engine oil circulating system wherein oil is transferred by a scavenge pump from the engine sump to a tank, the level detecting means comprises a small auxiliary or pilot pump which is operated in parallel with the scavenge pump. A small suction pipe, leading from a level within the sump above the level of the entrance to the scavenge suction pipe, communicates with the inlet to the pilot pump. A discharge pipe provides communication between the outlet of the pilot pump and one end, hereinafter called "the pressure end" of a control valve cylinder in which a piston valve is slidably arranged, and a return pipe, in which is fitted a flow-restricting orifice, provides communication between the pressure end of the control valve cylinder and the sump. Near the end of the piston valve remote from the pressure end of the cylinder the valve is formed with an annular recess. The piston valve is biased by a spring towards the pressure end of the cylinder and against a shoulder therein, and when the valve is in this position the said annular recess communicates with an inlet port and an outlet port formed in the wall of the cylinder. These ports are both closed by the piston valve when it is moved towards the opposite end of the cylinder, hereinafter called "the neutral end," in the manner hereinafter described. The said outlet port communicates with the inlet of the scavenge pump and the said inlet port communicates with a balance feed pipe leading from the said tank. In the scavenge pump suction pipe is provided a bias valve which is spring loaded to offer a resistance to the flow of oil therethrough sufficient to ensure that the flow of oil through the balance feed pipe will satisfy the requirements of the scavenge pump when required. A small pipe provides communication between the neutral end of the said control valve cylinder and the sump thus permitting the necessary displacement of oil to and from this end of the cylinder during movements of the piston valve.

Generally, the supply of oil to the sump from the engine is less than the capacity of the scavenge pump, so that there is a tendency for the level to fall. Assuming that it has fallen to some point below the entrance of the pilot pump suction pipe but is still above the entrance to the scavenge pump suction pipe, then the said auxiliary pump can only circulate air. The oil-flow restricting orifice in the pilot pump return pipe will, as previously explained, offer very little resistance to the flow of air, so that the pressure on the pressure end of the piston valve will be insufficient to move it against its spring. Thus, a free passage from the inlet port to the outlet port is provided in the cylinder and oil from the oil tank will, therefore, be free to flow through the balance feed pipe to the scavenge pump while the flow of oil to the scavenge pump from the sump will be restricted by the bias valve. In these circumstances, the flow of oil to the sump from the engine will exceed the flow from the sump to the scavenge pump so that the level of oil in the sump will commence to rise. As soon as the entrance to the pilot pump suction pipe is submerged, however, the pilot pump will commence to circulate oil which, owing to the resistance to flow by the flow-restricting orifice, will exert pressure on the pressure end of the piston valve causing it to be displaced towards the neutral end of the valve cylinder and to interrupt the flow of oil from the tank to the scavenge pump through the balance feed pipe. The scavenge pump will then be wholly fed from the sump and since its capacity is greater than the supply from the engine the level will commence to fall. Thus, when the level of the oil in the sump is below the entrance to the pilot pump suction pipe it begins to rise and when the level is above the said entrance it begins to fall. Thus the level is maintained approximately at the height of the pilot pump suction pipe entrance, it never falls to the level of the scavenge pump suction pipe entrance and thus prevents the flow of air through the scavenge pump suction pipe.

Two constructional forms of the invention, both applied to the oil circulating system of an aircraft engine, are shown by way of example on the accompanying drawing, whereon:

Figure 1:
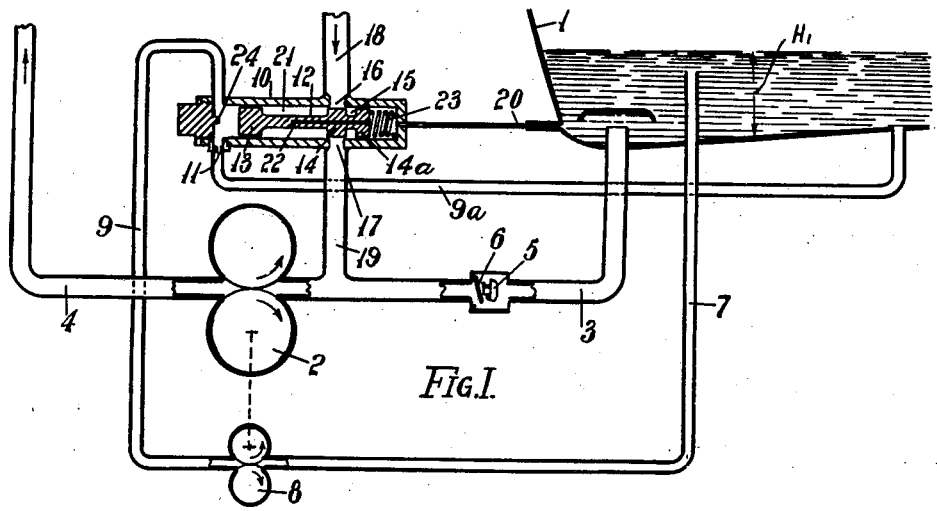
Fig. 1 is a diagrammatic view of one construction, in which the pilot pump is withdrawing oil from the sump and oil is being supplied to the scavenge pump from the sump.
Figure 2:
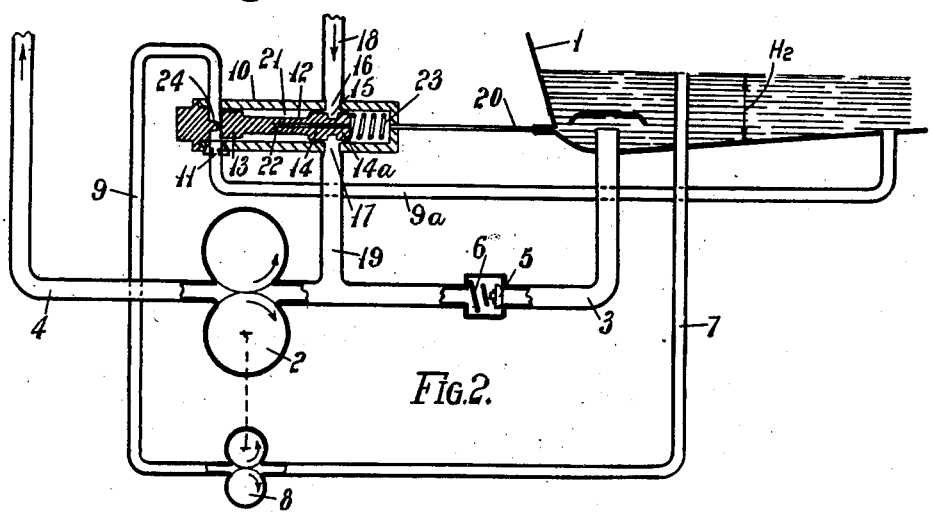
Fig. 2 is a diagrammatic view corresponding to Fig. 1, but showing the pilot pump withdrawing air from the sump and the scavenge pump receiving oil from the oil tank, the supply of oil to the scavenge pump from the sump when being restricted.

Referring first to Figs. 1 and 2:

Oil is transferred from the engine oil sump 1 to an oil scavenge pump 2 through a suction pipe 3, the discharge side of the pump being connected by a discharge pipe 4 to an oil storage tank (which is not shown in the drawing) from which it is returned to the engine by a pressure pump (also not shown). In the suction pipe 3 there is a bias valve 5, which is pressed towards its seat by a spring 6. A smaller suction pipe 7 projects into the engine sump at one end and is connected at its opposite end to the suction side of a small auxiliary or pilot pump 8 the discharge side of which is connected by a discharge pipe 9 to the pressure end of a cylinder 10. It will be noted that the end of the pipe 7 is arranged at a higher level in the sump than the end of the pipe 3. A return pipe 9A connects the pressure end of the cylinder 10 to the engine sump and in this pipe a flow-restricting orifice 11, calibrated to suit requirements, is provided.

A piston valve 12 is slidably arranged in the cylinder 10 and is formed with a piston part 13 slidable in the pressure end of the cylinder and valve parts 14, and 14a which are slidable in the neutral end of the cylinder. Between these parts is an annular recess 15. The valve part 14 serves to control the flow of oil from the tank to the scavenge pump feed pipe as will be seen later, while the valve part 14a prevents communication between the oil tank and the sump through a bleed-off pipe referred to hereinafter. Diametrically opposed inlet and outlet ports 16 and 17 are formed in the wall of the neutral end of the cylinder, the said ports being respectively connected to the said oil tank and to the scavenge pump suction pipe 3 by the balance feed pipes 18 and 19. A small leakage bleed-off pipe 20 connects the neutral end of the valve cylinder to the engine sump, and permits the necessary displacement of oil to and from the neutral end of the cylinder 10 during movements of the valve 12. That part of the valve 12 between the piston part 13 and the valve part 14 may be recessed to form an annular clearance space 21 and this clearance space may be connected to the neutral end by a port 22 and thence by the pipe 20 back to the sump.

By this means, any leakage that may take place from the pressure end past the piston 13 is carried back to the sump instead of being permitted to find its way past the valve part 14 to the port 17 and thence to the scavenge pump, where if the leakage consisted of air, it might cause aeration.

A spring 23 acts to force the piston valve into the position shown in Fig. 2, in which the recess 15 registers with the inlet and outlet ports 16 and 17 and communication is made via the balance feed pipes 18 and 19 from the oil tank to the scavenge pump suction pipe 3.

The travel of the valve 12 due to the expansion of the spring 23 is limited by contact of the valve with a stop 24.

The loading of the spring 6 acting upon the bias valve 5 is such that the valve will offer a resistance to the flow of oil through the pipe 3 sufficient to ensure that the flow of oil through the balance feed pipes 18 and 19 will satisfy the requirements of the scavenge pump when necessary. The pipe 20 permits the necessary displacement of oil to and from the neutral end of the cylinder 10 during movements of the piston valve.

The supply of oil to the sump from the engine is generally less than the capacity of the scavenge pump, hence the tendency of the oil level in the sump is to fall.

Assuming that the level has in this manner fallen low enough to expose the end of the pilot pump suction pipe 7 as shown at $H_2$ in Fig. 2, the pilot pump will then draw only air which will be delivered via the discharge pipe 9 and the pressure end of the control valve cylinder 10 to the restricting orifice 11. This orifice offers only very slight resistance to the flow of air delivered by the pilot pump, so that the pressure built up in the pressure end of the cylinder 10 will be insufficient to overcome the force of the spring 23.

The valve will accordingly remain in the open position shown in Fig. 2, maintaining free passage for the oil from the tank through the balance feed pipes 18 and 19 and the recess 15 to the suction side of the scavenge pump, flow of oil from the sump being restricted or stopped by the bias valve 5.

In these circumstances, the flow of oil from the engine to the sump will exceed the withdrawal of oil from the sump by the scavenge pump 2, and thus the level of the oil in the sump will commence to rise, until it covers the end of the pilot pump suction pipe 7, as shown at H, Fig. 1. Thereupon, the pilot pump commences to circulate oil and, because the flow-restriction orifice 11 resists the flow of oil far more than the flow of air, the pressure in the pressure end of the cylinder 10 builds up and, in due course, forces the piston valve into the position shown in Fig. 1 against the opposing action of the spring 23. In this position of the valve, the inlet and outlet ports 16 and 17 are masked by the valve part 14 and oil cannot flow from the oil tank into the scavenge pump suction pipe 3. The suction of the scavenge pump 2 then causes the bias valve 5 to open again against the action of its spring 6 and oil is again circulated by the scavenge pump from the sump through the pipe 4 into the oil tank. Under these conditions, the demand of the scavenge pump being greater than the supply, the oil level in the sump will again commence to fall and will continue to do so until it again falls to the top of the pilot pump suction pipe 7, whereupon the pilot pump again commences to circulate air and the sequence of operations, as described above, is repeated. Thus, whenever the oil in the sump is below the end of the pipe 7, the oil level begins to rise and when the oil is above the said end, the oil level begins to fall, so that the oil level is maintained approximately at the level of the end of the pipe 7 within the sump and effectively prevents the flow of air through the scavenge pump feed pipe 3.

Figure 3:
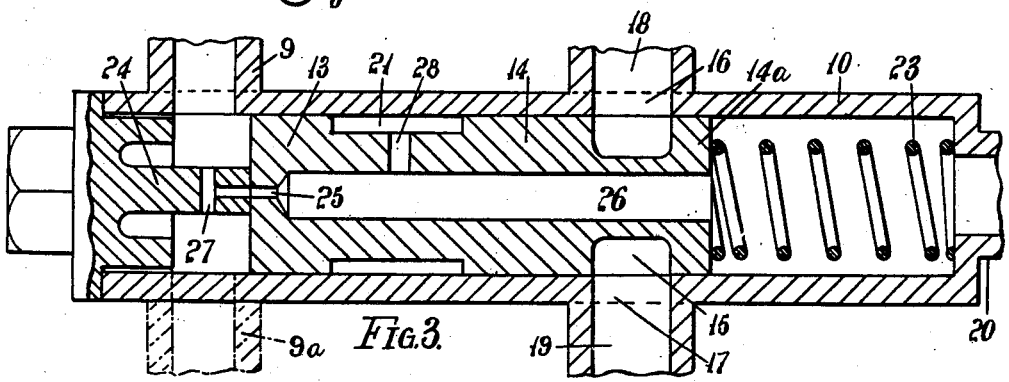
Fig. 3 is a sectional view, to a larger scale, of an alternative construction of the piston control valve.

A modified construction of the piston control valve is shown in Fig. 3. In this construction, the pilot pump discharge pipe 9 communicates with the pressure end of the cylinder 10 as before but the return pipe 9a with its flow restricting orifice is deleted, the orifice being arranged in the valve 12 itself. As drawn, it is shown at 25 in the pressure end of the valve and the passage 26 behind it is opened out to a relatively large diameter to provide free flow to the neutral end for any air or oil that passes.

In this construction, the leakage bleed-off pipe 20 needs to be somewhat larger in diameter as it has not only to conduct leakage but also the orifice discharge back to the sump. Further, the stop 24 must be arranged so that it does not blank off the orifice 25; for instance, it may be provided with an internal port 27 or it may be placed eccentrically.

The clearance space 21 may be connected to the neutral end by a small passage 28 opening into the passage 26.

Otherwise the construction of the valve is substantially as previously described.

In this modified construction, when the level of the oil in the sump falls below the top of the pilot pump suction pipe 7, and air is circulated by the pilot pump through the discharge pipe 9 into the pressure end of the cylinder 10 it passes via the flow restriction orifice 25, the bore 26, the neutral end of the cylinder and the leakage bleed pipe 20 into the sump. Under these conditions, the piston valve remains in the position shown in Fig. 3 and oil can flow into the scavenge pump suction pipe through the balance feed pipe 18, the annular recess 15 and the balance feed pipe 19. On the other hand, when the level of the oil in the sump rises above the end of the pilot pump suction pipe 7, the pilot pump commences to pump oil and because the flow of the oil from the cylinder is resisted by the flow-restriction orifice 25 the piston valve is forced to the right against the action of the spring 23. The flow of oil from the oil tank to the scavenge feed pipe is then cut off by the masking of the ports 16 and 17 by the piston valve part 14. When the level of the oil in the sump again falls below the end of the pilot pump suction pipe 7, the pilot pump again commences to pump air and the piston valve is returned to the position shown in Fig. 3 by the action of the spring 23.

Various modifications can, of course, be introduced without departing from the scope of the invention.

For example, the said piston valve may be replaced by a bellows or diaphragm operated valve.

Also, it will be understood that the said level detecting device can be in any convenient form such as an oil operated injector fed from either the scavenge pump or the oil pressure pump.

Further, in order to prevent the excessively high pressures that may be generated by the increased viscosity of the oil when starting up from cold, it may be necessary to provide relief additional to the flow-restricting orifice aforesaid.

This relief can be accomplished by the introduction of some form of spring-loaded relief valve, placed in parallel with the flow-restricting orifice. It may be formed in conjunction with the flow-restricting orifice, the plate in which the orifice is cut being used as a disc valve, or it may, by the provision of a suitable port or ports be formed in conjunction with the control valve itself or again a separate valve may be provided.

I claim:

1. In a liquid circulating system having a primary circulating circuit including a pump, a liquid container, and a source of liquid, wherein said pump is adapted to deliver liquid to said liquid source drawn either from said liquid container or from said liquid source, means preventing aeration of liquid in the system including liquid level detecting means in said liquid container, means in said primary circuit adapted to connect the inlet side of said pump to said liquid container or to said liquid source, a secondary circulating circuit controlling said last mentioned means, and means connecting said level detecting means to the intake of said secondary circulating circuit.

2. In a liquid circulating system having a primary circulating circuit including a pump, a liquid container, and a source of liquid, wherein said pump is adapted to deliver liquid to said liquid source drawn either from said liquid container or from said liquid source, means preventing aeration of liquid in the system including liquid level detecting means in said liquid container, means in said primary circuit adapted to connect the inlet side of said pump to said liquid container or to said liquid source, a secondary circulating circuit controlling said last mentioned means, said secondary circuit comprising a pilot pump, means connecting said level detecting means to the intake of said pilot pump, means connecting said primary circuit means to the outlet of said pilot pump, and means connecting said primary circuit means to said liquid container.

3. In a liquid circulating system having a primary circulating circuit including a pump, a liquid container, and a source of liquid, wherein said pump is adapted to deliver liquid to said liquid source from said liquid container, means preventing aeration of liquid delivered to said liquid source from said liquid container including liquid level detecting means in said liquid container, valve means in said primary circuit adapted to connect the inlet side of said pump to said liquid container or to said liquid source, said valve means being controlled by a secondary circulating circuit comprising control means for said valve means, a pilot pump, a conduit connecting said level detecting means to the intake of said pilot pump, a conduit connecting the outlet of said pilot pump to said valve control means, a conduit connecting said valve control means to said liquid container, and means in said valve control means to utilize the pressure developed in said secondary circulating circuit to actuate said valve control means.

4. In a liquid circulating system having a liquid container, a source of liquid and a pump for delivering liquid from said container to said liquid source, means preventing aeration of liquid circulated by said pump including means connecting said liquid source to the intake of said pump, liquid level detecting means in said liquid container, means connected to said level detecting means and responsive to the level of the liquid in said container, said means controlling the flow of liquid from said liquid source to said pump, means restricting the flow of liquid from said container to said pump when liquid is flowing thereto from said liquid source, whereby the liquid level in said container is maintained sufficiently high to prevent said pump from withdrawing air therefrom.

5. In a liquid circulating system, a liquid container, a source of liquid, a pump adapted to withdraw liquid from said container and deliver it to said liquid source, means connecting the intake of said pump with said liquid source, valve means in said last mentioned means, secondary liquid circulating means controlling said valve means, and second valve means disposed between the intake of said pump and said container, said second valve means being spring loaded to resist the suction of said pump when said pump is connected to said liquid source by said first mentioned valve means.

6. In a liquid circulating system having a liquid container, a source of liquid, and a pump for delivering liquid from said container to said liquid source, means preventing aeration of liquid withdrawn from said container, including level detecting means in said container adapted to withdraw air from said container when said liquid level falls below a predetermined level and adapted to withdraw liquid from said container when said liquid level is above the predetermined level, circulating means connected to said level detecting means, means connecting said liquid source to the intake of said pump, a control device in said last mentioned means operated by said circulating means and adapted to cut off the supply of liquid from said liquid source when said circulating means is withdrawing liquid from said container.

7. In a liquid circulating system having a primary circulation circuit including a pump, a liquid container, and a liquid source, said pump being adapted to deliver liquid to said liquid source alternately from said liquid container and from said liquid source, means preventing aeration of liquid delivered to said liquid source comprising means connecting the intake of said pump to said liquid container, means connecting the intake of said pump to said liquid source, and a secondary circulating circuit having liquid circulating means, level detecting means in said liquid container and connected to the intake of said liquid circulating means, and control means in said means connecting said liquid source with the intake of said pump, said control means being connected to the outlet of said liquid circulating means and to said liquid container.

8. In a liquid circulating system, a pump, a liquid container, a suction pipe connecting said pump to said container, a source of liquid, a discharge pipe connecting said pump to said liquid source, and means preventing the aeration of liquids circulated by said pump, including means connecting said liquid source to said suction pipe, means in said suction pipe to restrict the flow of liquid from said container to said pump when said pump is receiving liquid from said liquid source, means controlling the flow of liquid from said liquid source to said pump, liquid level detecting means in said container, fluid circulating means, a discharge pipe connecting said fluid circulating means to said control means, and a feed pipe connecting said fluid circulating means to said liquid level detecting means, said liquid level detecting means being so disposed in said container that when the liquid in said container falls below a predetermined level said fluid circulating means is adapted to withdraw air from said container and return it thereto without actuating said control means, whereby liquid flows from said source to said pump, and when the liquid in said container rises above the predetermined level said fluid circulating means is adapted to withdraw liquid from said container and actuate said control means, whereby the flow of liquid from said liquid source to said pump is cut off and said pump withdraws liquid from said container.

9. In a liquid circulating system, a liquid container, a pump, a feed pipe connecting said pump to said container, a source of liquid, a discharge pipe connecting said pump to said liquid source, means preventing the aeration of liquid circulated from said container to said liquid source by said pump, said means comprising fluid circulating means, a feed pipe connecting said fluid circulating means to said container and projecting into said container to a higher level therein than said pump feed pipe, means connecting said source of liquid to said pump feed pipe, control means adapted to open and close communication between said liquid source and said pump feed pipe, a discharge pipe connecting said fluid circulating means to said control means, and means in said pump feed pipe restricting the flow of liquid from said container to said pump when said control means connects said pump feed pipe and said liquid source, said last mentioned means adapted to prevent the flow of liquid from said container to said pump when said control device cuts off communication between said liquid source and said pump feed pipe.

10. In an oil circulating system for engines, a scavenge pump, a sump, a source of liquid, a pipe connecting the intake of said pump to said sump, a second pipe connecting the outlet of said pump to said liquid source, and means preventing aeration of the circulated liquid including, a pilot pump, a feed pipe connected to the intake of said pilot pump and projecting into said sump to a higher level than said scavenge pump, intake pipe means connecting said liquid source to said scavenge pump intake, a control valve in said last mentioned means, a discharge pipe connecting said pilot pump to said control valve, a pipe connecting said control valve to said sump, a flow restricting orifice in said control valve, and means in the intake pipe of said scavenge pump for restricting the flow of oil therethrough when oil is flowing from said liquid source.

11. In a liquid circulating system having a liquid container, a source of liquid, and a pump adapted to withdraw liquid from said liquid container and deliver it to said source of liquid, means preventing aeration of the liquid circulated from said container to said source of liquid, said means including a control valve comprising a cylinder having a pressure end and a neutral end, a port in said neutral end connected to said liquid source, a second port in said neutral end connected to the intake of said pump, a valve body in said cylinder having a valve member disposed in said neutral end and a piston member disposed in said pressure end, and means biasing said valve body toward said pressure end, fluid circulating means connecting said pressure end to said sump, and a conduit connecting said pressure end to said sump and having a restricting orifice therein whereby the creation of a liquid pressure in said pressure end of said cylinder actuates said valve member to close said ports in said neutral end.

12. In a liquid circulating system having a liquid container, a source of liquid, and means adapted to withdraw liquid from said liquid container and deliver it to said source of liquid and adapted to circulate liquid from said source of liquid and back to said source of liquid when the level of the liquid in said container is below a predetermined point, means automatically connecting said first means to said liquid container or to said liquid source including a control valve comprising a cylinder having a pressure end and a neutral end, ports connecting said neutral end with said liquid source and with said liquid circulating means, a port connecting said pressure end to said liquid container, a valve body disposed in said cylinder, means biasing said valve body toward said pressure end, a conduit through said valve body connecting said pressure end with said neutral end, a restricting orifice in said conduit, a port in said neutral end of said cylinder connected to said liquid container, said valve body being formed with a piston at said pressure end and a valve member at said neutral end, and secondary liquid circulating means adapted to circulate liquid from said liquid container to the pressure end of said valve body.

13. In a liquid circulating system having a liquid container, a liquid source, circulating means adapted to deliver liquid to said liquid source and to withdraw liquid from said liquid container when the level of the liquid in said container is above a predetermined point, and adapted to withdraw liquid from said source of liquid when the level of the liquid in said container is below a predetermined point, and means preventing aeration of liquid including a control valve comprising a cylinder having a pressure end and a neutral end, a valve body disposed in said cylinder, means biasing said valve body to said pressure end, a piston formed on said valve body at said pressure end, a valve member formed on said valve body at said neutral end, an intake port at said pressure end, an outlet port at said pressure end having a restricted orifice, an intake port at said neutral end connected to said liquid source, an outlet port at said neutral end connected to the inlet of said first-mentioned means, said neutral end ports being adapted to be closed by said valve member when pressure is developed in said pressure end of said cylinder, and means for developing pressure at said pressure end.

14. In a liquid circulating system having a liquid container, a source of liquid, and a pump adapted to withdraw liquid from the liquid container and deliver it to the source of liquid, the combination of a control valve comprising a cylinder having a pressure end and a neutral end, a port in said neutral end connected to the liquid source, a second port in said neutral end connected to the intake of the pump, a valve body in said cylinder having a valve member disposed in said neutral end and a piston member disposed in said pressure end, means for withdrawing liquid from the container and for delivering it under pressure to said pressure end, a constantly open inlet port in said pressure end connected to said last-mentioned means, an outlet from said pressure end, and a restricting orifice in said outlet, whereby the creation of a predetermined liquid pressure in said pressure end by said last-mentioned means actuates said valve member to close said ports in said neutral end and shut off the connection between the source of liquid and the pump, the pump then withdrawing liquid only from the container.

15. In a liquid circulating system having a liquid container, a source of liquid, and a pump adapted to withdraw liquid from the liquid container and deliver it to the source of liquid, the combination of a control valve comprising a cylinder having a pressure end and a neutral end, a port in said neutral end connected to the liquid source, a second port in said neutral end connected to the intake of the pump, a valve body in said cylinder having a valve member disposed in said neutral end and a piston member disposed in said pressure end, and means biasing said valve body toward said pressure end, means for withdrawing liquid from the container and for delivering it under pressure to said pressure end, a constantly open inlet port in said pressure end connected to said last-mentioned means, a second outlet port in said neutral end in constant communication with the container, a conduit in said valve member in constant communication with said neutral end and with said second outlet port, and a flow restricting orifice in said valve member connecting said pressure end to said conduit, whereby the creation of a predetermined pressure in said pressure end by said last-mentioned means actuates said valve member to shut off communication between the source of liquid and the pump, the pump then withdrawing liquid only from the container.

16. The combination set forth in claim 15, wherein a stop in said pressure end limits the movement of said valve member toward said pressure end, said stop being formed with a conduit therethrough in constant communication with said inlet port in said pressure end and with said restricting orifice and said conduit in said valve member.

CAMILLE CLARE SPRANKLING LE CLAIR.